(12) United States Patent
Dolgin et al.

(10) Patent No.: US 9,451,185 B2
(45) Date of Patent: Sep. 20, 2016

(54) MULTI-SPECTRAL OPTICAL TRACKING SYSTEM AND METHODS

(71) Applicant: RAYTHEON COMPANY, Waltham, MA (US)

(72) Inventors: Benjamin P. Dolgin, Alexandria, VA (US); Michael R. Moan, Colleyville, TX (US); Gerald W. Robertello, Centreville, VA (US); Clayton Davis, Springfield, VA (US); James C. Zellner, Centreville, VA (US)

(73) Assignee: RAYTHEON COMPANY, Waltham, MA (US)

( * ) Notice: Subject to any disclaimer, the term of this patent is extended or adjusted under 35 U.S.C. 154(b) by 314 days.

(21) Appl. No.: 14/200,176

(22) Filed: Mar. 7, 2014

(65) Prior Publication Data

US 2015/0256768 A1   Sep. 10, 2015

(51) Int. Cl.
H04N 5/33 (2006.01)
H04N 5/265 (2006.01)
H04N 5/232 (2006.01)

(52) U.S. Cl.
CPC .......... *H04N 5/332* (2013.01); *H04N 5/23293* (2013.01); *H04N 5/23296* (2013.01); *H04N 5/265* (2013.01)

(58) Field of Classification Search
None
See application file for complete search history.

(56) References Cited

U.S. PATENT DOCUMENTS

| | | | |
|---|---|---|---|
| 5,028,799 A | 7/1991 | Chen et al. | |
| 6,034,718 A | 3/2000 | Hattori | |
| 6,515,285 B1 | 2/2003 | Marshall et al. | |
| 7,333,270 B1 * | 2/2008 | Pochapsky | F41G 1/32 250/330 |
| 2002/0097497 A1 * | 7/2002 | Kamo | G02B 15/14 359/629 |
| 2004/0184163 A1 | 9/2004 | Nishioka et al. | |
| 2007/0282190 A1 * | 12/2007 | Dekel | A61B 1/041 600/407 |
| 2008/0055412 A1 | 3/2008 | Tanaka | |
| 2010/0026785 A1 | 2/2010 | Soto-Thompson et al. | |
| 2010/0166334 A1 | 7/2010 | Zhang et al. | |
| 2010/0235095 A1 * | 9/2010 | Smitherman | G01C 11/02 701/532 |
| 2010/0265331 A1 | 10/2010 | Tanaka | |
| 2011/0064327 A1 * | 3/2011 | Dagher | G06T 5/004 382/263 |
| 2012/0242826 A1 * | 9/2012 | Holmes | G01N 21/3151 348/92 |
| 2012/0287264 A1 | 11/2012 | Hong et al. | |
| 2012/0320193 A1 | 12/2012 | Lienhart et al. | |
| 2013/0250068 A1 | 9/2013 | Aoki | |
| 2014/0198185 A1 | 7/2014 | Haugen et al. | |
| 2015/0103140 A1 * | 4/2015 | Kostuk | A61B 1/00163 348/40 |
| 2015/0205083 A1 | 7/2015 | Dolgin | |
| 2015/0215516 A1 | 7/2015 | Dolgin | |

OTHER PUBLICATIONS

"Foveated Imaging"—Wikipedia, the free encyclopedia, <http://en.wikipedia.org/wiki/Foveated_imaging>, accessed via the internet on Jan. 27, 2014, 4 pages.

* cited by examiner

*Primary Examiner* — Sath V Perungavoor
*Assistant Examiner* — Janese Duley
(74) *Attorney, Agent, or Firm* — Lando & Anastasi, LLP

(57) ABSTRACT

Methods and apparatus for producing multi-spectral images having variable (non-uniform) magnification over the lateral extent of the image. In one example, a multi-spectral imaging system includes a first sensor sub-system configured to receive electromagnetic radiation in a first spectral band from a scene and to provide a first image signal, a second sensor sub-system configured to receive electromagnetic radiation in a second spectral band from the scene and to provide a second image signal, a processor coupled to the first and second sensor sub-systems and configured to produce a first image of the scene from the first image signal, and a second image of the scene from the second image signal, the second image having a variable lateral magnification, and a display coupled to the processor and configured to display the second image overlaid with the first image.

15 Claims, 6 Drawing Sheets

MULTI-SPECTRAL OPTICAL TRACKING SYSTEM AND METHODS

BACKGROUND

Optical remote sensing devices are widely used in both commercial and military applications. Many applications involve long range tracking and aiming, and as a result, require a high level of magnification, or zoom, in the optics. Tracking small objects, such as vehicles or people, from long range is difficult because the high zoom of the tracking optics required to see the object necessitates a narrow field of view. As a result of the narrow field of view, it is difficult to reacquire the object if it is lost due to terrain, shadows, or other phenomena. Furthermore, pure optical tracking of vehicles or other relatively small objects is severely impeded by the presence of tree canopies, shadows, and urban terrain which may obscure the object.

Traditional approaches to addressing these issues have involved the use of variable zoom optics and systems with sophisticated tracking algorithms. However, such systems suffer from several disadvantages and are only somewhat effective. For example, there is a time delay associated with changing the zoom, during which time the target object may move outside of the field of view. Also, in certain systems the optics are not focused during the zooming action, and therefore the target object may not be visible during the zoom and may be lost as a result. Additionally, the moving parts associated with most traditional variable zoom optics are common points of failure in the system. Sophisticated LIDAR ranging techniques have been developed to attempt to located objects below tree canopies, for example, by looking for the object through the tiny openings between leaves; however, traditional systems are complicated and expensive. Accordingly, there exists a need for a simple, robust optical system capable of performing long range tracking of relatively small objects, such as vehicles.

SUMMARY OF INVENTION

Aspects and embodiments are directed to methods and systems for tracking a remote object using multiple spectral bands together with the ability to vary the level of magnification of a viewed scene over the lateral extent of the display.

According to one embodiment, a multi-spectral imaging system comprises a first sensor sub-system configured to receive electromagnetic radiation in a first spectral band from a scene and to provide a first image signal, a second sensor sub-system configured to receive electromagnetic radiation in a second spectral band from the scene and to provide a second image signal, a processor coupled to the first and second sensor sub-systems and configured to produce a first image of the scene from the first image signal, and a second image of the scene from the second image signal, the second image having a variable lateral magnification; and a display coupled to the processor and configured to display the second image overlaid with the first image.

In one example, each of the first sensor sub-system and the second sensor sub-systems includes a photo-sensitive detector and optics configured to focus the electromagnetic radiation onto the detector. In one example, the first spectral band includes the ULF/VLF spectral band. In another example, the second spectral band includes the visible spectral band. The system may further comprise a third sensor sub-system configured to receive electromagnetic radiation in a third spectral band from a scene and to provide a third image signal, wherein the processor is coupled to third sensor sub-system and configured to produce a third image of the scene from the third image signal, and wherein the display is configured to display the third image overlaid with the first and second images. In one example, the third spectral band includes the RF spectral band. The second sensor sub-system may comprise a first camera having a first field of view and a first level of magnification, and configured to produce a first component image, and a second camera aligned with the first camera and having a second field of view, different from the first field of view, and a second level of magnification, different from the first level of magnification, and configured to produce a second component image, wherein the processor is coupled to the first and second cameras and configured to digitally process the first and second component images to produce the second image as a composite image having the variable lateral magnification derived from the first and second component images. In one example, the second field of view is narrower than the first field of view, and the second level of magnification is higher than the first level of magnification, and the second field of view corresponds to a central portion of the first field of view. The processor may be configured to digitally process the first and second component images to produce the composite image having high magnification in a center of the composite image, and progressively lower magnification towards a periphery of the composite image. In another example, the second sensor sub-system comprises primary optics configured to receive and direct the electromagnetic radiation in the second spectral band onto a focal plane to form a substantially planar intermediate image at the focal plane, the intermediate image having substantially uniform lateral magnification, second optics configured to reimage the intermediate image onto an image plane to produce an output image having variable lateral magnification, and a photo-sensitive detector positioned at the image plane configured to produce the second image signal corresponding to the output image. The second optics may comprise a curvature enhancer positioned on the focal plane and configured to curve the focal plane to form a curved focal plane, and at least one variable focus lens or mirror configured to reimage the intermediate image formed at the curved focal plane onto the image plane. In one example, the curvature enhancer includes a cylindrical concave lens. In another example, the curvature enhancer includes a pair of cylindrical lenses.

According to another embodiment, a multi-spectral imaging method comprises receiving electromagnetic radiation in a first spectral band and producing a first image therefrom, receiving electromagnetic radiation in a second spectral band and producing therefrom a second image having a variable lateral magnification, and displaying the second image overlaid with the first image on a display.

In one example, receiving the electromagnetic radiation in the first spectral band includes receiving ULF/VLF radiation. In another example, receiving the electromagnetic radiation in the second spectral band includes receiving visible electromagnetic radiation. In one example, producing the second image includes bending the electromagnetic radiation in the second spectral band to form a curved focal plane, relaying the electromagnetic radiation in the second spectral band from the curved focal plane onto a photo-sensitive detector positioned on an image plane, the photo-sensitive detector having a surface that is substantially flat in the image plane, and producing the second image with the photo-sensitive detector. In another example, producing the second image includes receiving a first component image having a first level of magnification and representing a first field of view, simultaneously receiving a second component image having a second level of magnification and representing a second field of view, the second level of magnification being higher than the first level of magnification and the second field of view being narrower than the first field of view, and digitally processing the first and second component images to produce the second image having the variable lateral magnification derived from the first and second levels of magnification. In one example, digitally processing the first and second component images to produce the second image includes producing the second image having the second level of magnification at a center of the second image and the first level of magnification at a periphery of the second image.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
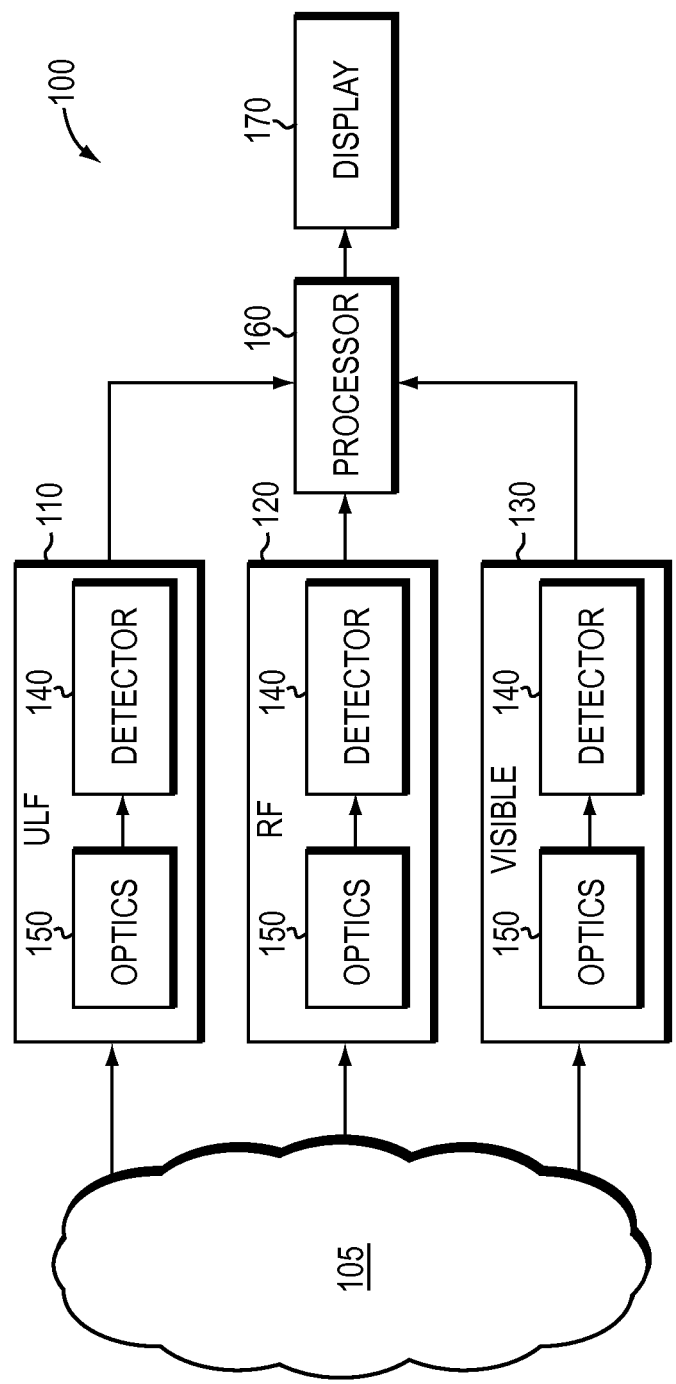
FIG. 1 is a block diagram of one example of a multi-spectral optical system according to aspects of the invention.

Ultra-low/Very low frequency electromagnetic (ULF/VLF) emissions from cars may be identified and tracked. ULF/VLF radiation is unaffected by certain obscurations, such as tree canopies, for example. Accordingly, ULF/VLF radiation may be used for tracking in environments where obscurations limit the effectiveness of tracking devices operating in the visible spectral band. Aspects and embodiments are directed to a multi-spectral optical tracking approach, in which combined electromagnetic radiation over a wide range of spectral bands, for example, from ULF/VLF, through RF (radio frequency), to visible, is used to track objects in complicated terrain. In addition, according to certain embodiments, multi-spectral optical tracking systems are configured to provide different levels of magnification over the field of view of the optics in at least one of the spectral bands, as discussed in more detail below. With this capability, the system may provide both a relatively wide field of view that facilitates acquiring target objects and preventing the target object from being lost as it moves, and a relatively high zoom in a portion of the field of view that facilitates precise viewing and tracking of the target object. The ability to simultaneously view a wide field of view and have high zoom in a selected region of the field of view (for example, the center) may provide greatly improved situational awareness and significantly ease the task of tracking of small objects at long range.

According to certain embodiments, tracking using passive electromagnetic emissions from a vehicle, such as a car, for example, is combined with optical tracking, for example, in the visible and/or infrared spectral bands, and optionally also with active and/or passive tracking using RF electromagnetic radiation. This combined approach may mitigate the presence of different obscurations along the path of the tracked vehicle. As discussed in more detail below, in certain embodiments, a single combined display is configured to display overlaid information layers with variable zoom on top of one another. For example, a very wide angle ULF/VLF image may be overlaid on top of a medium-zoom wide angle camera (e.g., visible) image, which in turn may be overlaid on top of high-zoom narrow angle camera image that has the highest magnification of all the images. Additionally, the display may be configured to have a variable radial or lateral magnification over its surface. In other words, the display may display images with variable magnification (zoom) that is not uniform over the surface of the display. For example, the magnification may be variable (i.e., not constant) from the center of the display to the periphery. In another example, the magnification changes according to a prescribed rule, such as, for example, magnification that changes as a function of the distance from the center of a display to a given point on the display, magnification that changes as a function of the x and/or y coordinates on the display, or other variations. As a result, certain portion of the image may be viewed with high resolution, while still maintaining the ability to also (and simultaneously) view a wider field of view with lower resolution. As used herein, the term "variable lateral magnification" is intended to refer to all such arrangements, and other variations of magnification distribution, where the magnification is variable or non-uniform over the surface of the display or field of view of the optical system. Similarly, an image having variable lateral magnification has different levels of magnification and resolution over the plane or surface of the image (e.g., from the periphery to the center, for example). In one embodiment, the display may have higher magnification at and near its center, and lower magnification at the periphery; however, other configurations and distributions of the magnification level(s) over the display may be implemented, as discussed further below.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Referring to FIG. 1, there is illustrated a block diagram of one example of multi-spectral optical tracking system according to one embodiment. The system 100 includes a plurality of sensor sub-systems, each configured to receive electromagnetic radiation in a different spectral band from a viewed scene 105. In the illustrated example, the plurality of sensor sub-systems includes a ULF/VLF sub-system 110, an RF sub-system 120, and a visible sub-system 130; however, in other examples, the plurality of sensor sub-systems may include sensors operable in other spectral bands, for example, one or more infrared spectral bands, the ultraviolet spectral band, and/or other spectral bands. Each of the plurality of sensor sub-systems may include one or more photo-sensitive detectors 140 and associated read-out circuitry, such as a focal plane array or other imaging sensor, along with optics 150 (such as one or more lenses and/or mirrors) configured to direct and focus electromagnetic radiation in the respective spectral band onto the photo-sensitive detector(s) 140. The sensor sub-systems are coupled to a processor 160 configured to receive and process images of the viewed scene from the sensor sub-systems. The processor 160 is coupled to a display 170 configured to display the processed images from each of the sensor sub-systems, optionally overlaid with one another and optionally in combination with other information from the processor 160, for viewing by an operator of the system 100.

According to one embodiment, each of the sensor sub-systems 110, 120, 130 may have a different field of view and/or level of magnification (zoom), to provide varying images of a viewed scene. The level of magnification of each sensor sub-system may be variable by providing variable zoom optical elements (such as one or more variable zoom lenses, for example) within the associated optics 150. Accordingly, the processor 160 may implement any of a variety of known image processing techniques to combine and register the images from the different sensor sub-systems 110, 120, 130, such that they may be overlaid on the display 170 and presented to the operator in a meaningful way. In one embodiment, to facilitate alignment of the images from the various sensor sub-systems 110, 120, 130, the sensor sub-systems may be aligned to one another in a known manner, such that there is a known registration between their fields of view. In one example, the sensor sub-systems may be co-bored and may share a common optical aperture (i.e., have a common line of sight), such that the fields of view of the sensor sub-systems spatially overlap, and the image signals from each sub-system can be processed using this information.

As discussed above, in one embodiment, in addition to combining image signals in different spectral bands from multiple different sensor sub-systems, the optical system 100 may be configured to provide the display 170 with variable lateral magnification (and therefore variable lateral resolution).

Unlike the lenses of human eyes, and traditional optical lenses with traditional detectors, which have a relatively constant level of magnification over the entire lens, lenses and the distribution of the optical receptors in the eyes of certain birds of prey (e.g., eagles) have effectively much higher magnification and resolution in the center compared to that at the periphery. Thus, if a target object (e.g., a mouse or other small animal in the case of an eagle) is in the center of the field of view, the bird is able to see the animal with a large amount of detail (enabling the bird to hunt the animal), whereas at the periphery of the field of view the bird is barely able to see the animal. This adaption addresses the issues discussed above, namely that tracking a small, and particularly fast moving object, through a field of view similar to a narrow angle camera is extremely difficult. With the variable magnification in the bird's eyes, although the area of high resolution is reduced, the bird is nonetheless still able to see and track the animal when it moves slightly out of the center of the field of view.

Aspects and embodiments provide the display 170 with a similar capability. Variable lateral magnification over the display may be achieved using certain configurations of the optics 150, and optionally detectors 140, software algorithms implemented by the processor 160, and/or combinations of both. In one embodiment, the visible sensor sub-system 130 and processor 160 are configured to display a visible image of the scene 105 with variable lateral magnification. This visible image may be overlaid with images produced from either or both of the ULF/VLF and RF sensor sub-systems 110, 120. However, in other examples, images with variable lateral magnification may be produced for spectral bands other than the visible band, and may be displayed on display 170 alone or overlaid with images from any one more other spectral bands. With the ability to provide variable zoom that is not uniform over the surface of the display 170, for example, with the zoom the highest in the middle and the lowest at the edges of the display, all scales of images may be presented holistically. In one example, in which a vehicle is being tracked, in the center of the image on the display 170, the vehicle may be zoomed to the point where the outlines of a passenger are visible. If location of the vehicle is shifted to the periphery, only general outlines of the vehicle may be distinguishable.

Figure 2A:
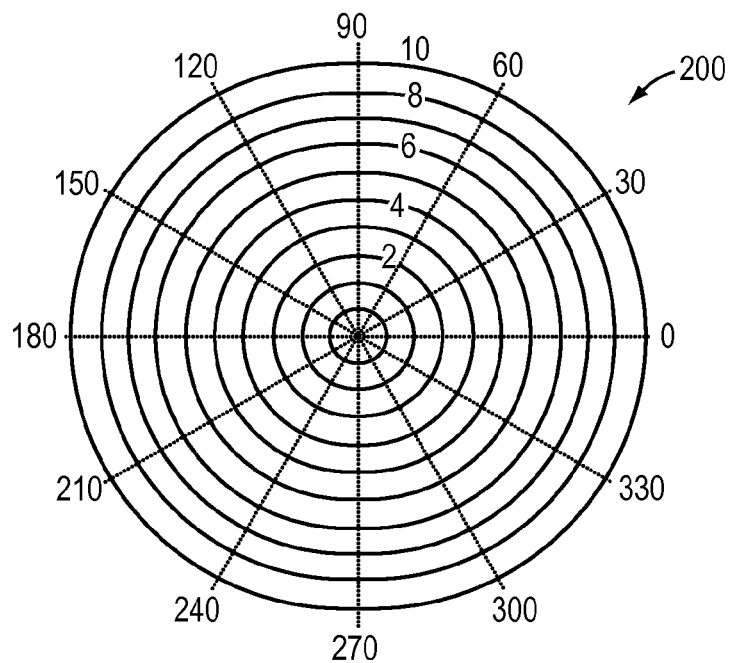
FIG. 2A is a diagram illustrating a representation of a "bulls eye" target with conventional uniform magnification over a field of view.
Figure 2B:
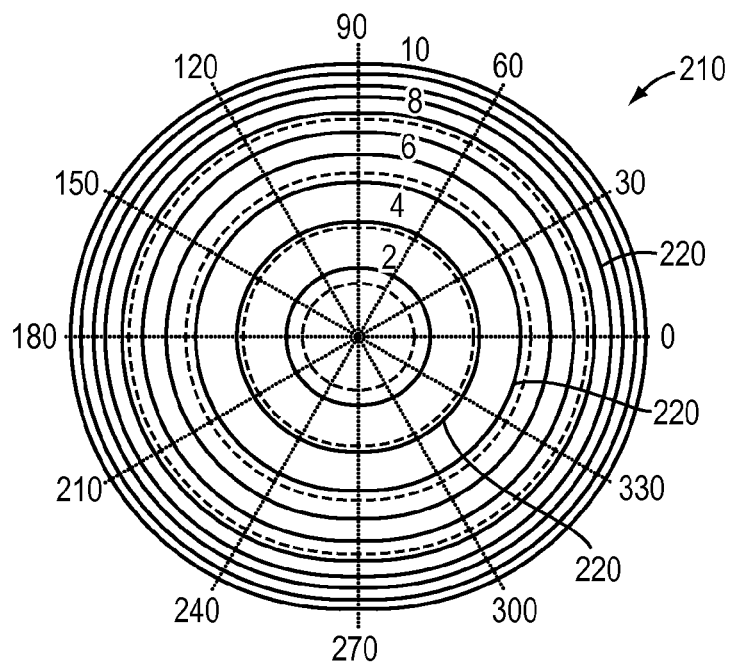
FIG. 2B is a diagram illustrating the "bulls eye" target of FIG. 2A with an example of variable lateral magnification over the field of view, according to aspects of the invention.

FIGS. 2A and 2B demonstrate an example of the difference between a uniform level and distribution of magnification over a field of view and variable lateral magnification, using a "bull's eye" target. FIG. 2A illustrates the "bulls eye" target 200 as it appears on a display with a conventional, uniform magnification distribution. The uniform magnification is represented by contour lines 2, 4, 6, 8, 10, which are evenly spaced. In this case, the magnification may be high or low, but it is uniform over the entire field of view. In contrast, FIG. 2B illustrates an example of the "bulls eye" target 310 displayed on a display having variable lateral magnification. In the case of FIG. 2B, the magnification varies over the field of view, as represented by variably spaced contour lines 220. In this illustrated example, the magnification is higher towards the center of the field of view (the contour lines are further apart), and lower towards the periphery of the field of view (where the contour lines are more closely spaced).

Figure 3:
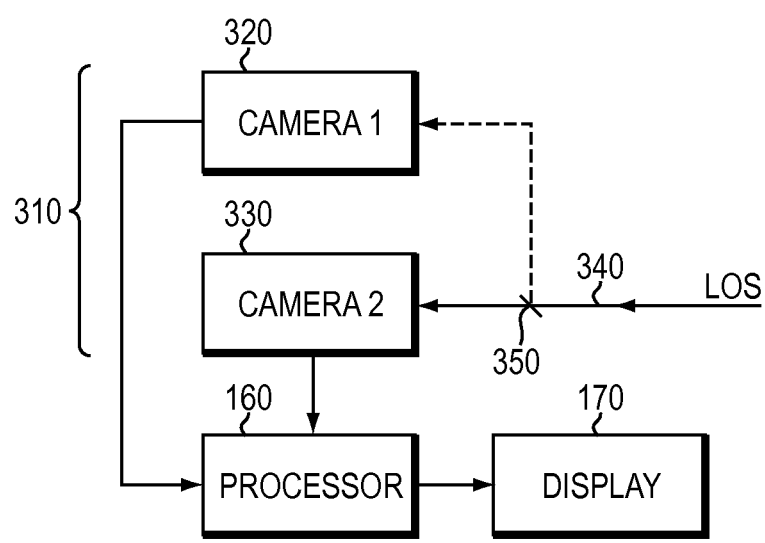
FIG. 3 is a block diagram of one example of a system configured to provide a display having variable lateral magnification according to aspects of the invention.

According to one embodiment, an image with variable lateral magnification may be achieved by processing, in combination, image signals from two aligned or co-bored cameras with different levels of zoom. Thus, referring to FIG. 3, according to one embodiment, a sensor sub-system 310 (which may be any one or more of sensor sub-systems 110, 120, 130) includes two co-bored or aligned cameras 320, 330. A first camera 320 may be a wide angle camera (i.e., have a relatively wide field of view), and a second camera 330 may be a narrow angle camera (i.e., have a relatively narrow field of view). Either or both of the cameras 320, 330 may have optical zoom. Each of the cameras 320, 330 may include the detector 140 and optics 150 configured to receive and focus incoming electromagnetic radiation 340 from the scene 105 onto the detector 140. The cameras 320, 330 are coupled to the processor 160. Although the exemplary sensor sub-system 310 shown in FIG. 3 includes two aligned cameras 320, 330, it will be appreciated by those skilled in the art, given the benefit of this disclosure, that various embodiments are not limited to using two cameras. In other implementations, a single camera system with multiple fields of view and/or zoom options and configured to produce multiple registered images of the scene 105 with different levels of magnification, or more than two aligned cameras may be used, and the processor 160 may be configured to process images from the one or more cameras. Thus, the example discussed herein using two cameras is intended for illustration and explanation only, and is not intended to be limiting.

According to one embodiment, the processor 160 is configured to synthesize a variable zoom image in real time by processing the signals from the two aligned cameras 320, 330. The processor 160 may use any of several well known image processing techniques to combine the signals from the two cameras 320, 330 to produce a composite image. In one example, the cameras 320, 330 are co-bored (i.e., have a common line of sight). In another example, the two cameras are aligned with a known offset, such that the processor can use the known alignment information to process the two image signals and produce the composite image. In the block diagram example illustrated in FIG. 3, a beamsplitter 350, or other optical beam-directing device, may be used to achieve alignment or a co-bored arrangement of the two cameras 320, 330; however, the cameras may be aligned and optionally configured to share a common optical path using any of numerous well known techniques and components.

As discussed above, in one embodiment, the first camera 320 is a wide angle camera, and therefore provides a first image that covers a relatively wide field of view. The second camera 330 may be a narrow angle camera, and may have optical zoom associated with it. The second camera may therefore provide a second image that covers a smaller field of view than the first image, but is of relatively high magnification/resolution. The first camera 320 may or may not have optical zoom associated with it; however, generally the first image provided by the first camera may have lower magnification/resolution than the second image. The processor 160 processes the first and second images, using the known alignment relationship between the first and second cameras 320, 330, to produce the composite image having regions with different levels of magnification, corresponding to the different levels of zoom of the two cameras as well as optional additional digital zoom, for display on the display 170. As discussed above, in one example, the image produced by the second, narrow angle camera 330, corresponds to a central portion of the wider field of view of the first, wide angle camera 320. Accordingly, in this example, the composite image has higher resolution in the center and lower resolution at the periphery.

Furthermore, digital image processing may be performed by the processor 160 to "smooth" the magnification variation, thereby creating a composite image having a gradient magnification across the image, rather than a "step" transition between the magnification region and the lower magnification region. In one example, the processor 160 is configured to produce the composite image having a high magnification in the center (corresponding to the magnification of the narrow angle camera, optionally enhanced with additional digital zoom), to low magnification at the periphery (corresponding to the magnification of the wide angle camera). In certain examples, the processor 160 is configured to dynamically adjust the lateral magnification of the displayed image. For example, the image may be displayed with uniform low magnification (e.g., corresponding to the magnification of the wide angle camera) over the whole display, or high magnification in the center and progressively lower magnification towards the periphery, or high magnification over the whole display, with these options being dynamically configurable by the processor 160.

Various aspects, embodiments, and examples of a system configured to display images with variable lateral magnification are described in more detail in commonly-owned, co-pending U.S. application Ser. No. 14/164,953 titled "IMAGING SYSTEM AND METHODS WITH VARIABLE LATERAL MAGNIFICATION" and filed on Jan. 27, 2014, which is herein incorporated by reference in its entirety for all purposes.

According to another embodiment, the optics 150 in one or more of the sensor sub-systems 110, 120, 130 may be configured to provide variable levels of magnification over the field of view of the sensor sub-system, such that the associated detector 140 may produce an image of the viewed scene 105 that has a variable lateral magnification. As discussed above, in one embodiment, the optics 150 is configured to provide higher magnification at and near the center of the field of view, and lower magnification at the periphery; however, other configurations may be implemented.

Figure 4:
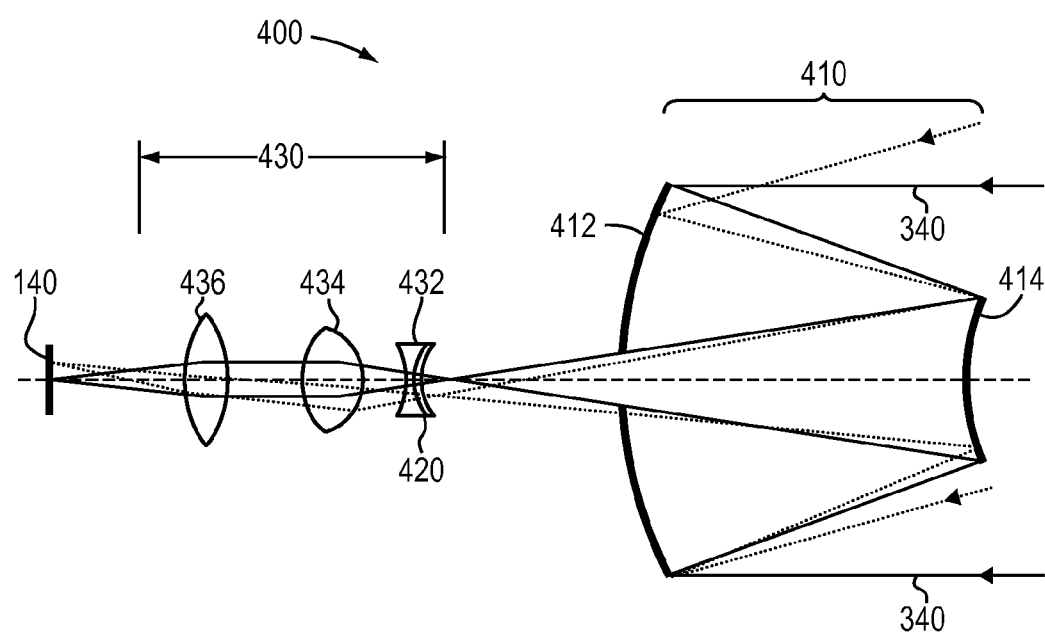
FIG. 4 is a block diagram of one example of an optical system including optics configured to provide variable lateral magnification, according to aspects of the invention.

Referring to FIG. 4, there is illustrated a block diagram of one example of a sensor sub-system 400 having variable lateral magnification according to certain embodiments. The sensor sub-system 400 includes primary optics 410, also optionally referred to as a telescope or foreoptics, which are configured to receive incident electromagnetic radiation 340 from the viewed scene 105 and focus the electromagnetic radiation onto a focal plane 420. The sensor sub-system 400 further includes optics 430 configured to direct and focus the electromagnetic radiation 340 from the focal plane 420 onto the detector 140 positioned at an image plane of the sub-system. In the example illustrated in FIG. 4, the primary optics 410 includes two reflecting mirrors 412 and 414; however the primary optics may include any number of a variety of optical elements, reflective or refractive, arranged in any of numerous well known configurations, not limited to the two-mirror arrangement shown in FIG. 4. In one embodiment, the optics 430 corresponds to the optics 150 in one or more of the sensor sub-systems 110, 120, 130 of FIG. 1. In this example, the primary optics 410 may be shared by two or more of the sensor sub-systems 110, 120, 130. In another embodiment, the optics 430 and the primary optics 410 together correspond to the optics 150 in one or more of the sensor sub-systems 110, 120, 130.

According to one embodiment, the optics 430 includes a curvature enhancer 432 positioned at the focal plane 420 and configured to produce a curved focal plane 130. As a result, variable lateral magnification is achieved in the image over the field of view by reimaging the curved focal plane onto a flat detector 140 using a variable power lens. The curved focal plane 420 causes there to be a variation in the distance between the focal plane and the detector 140 over the surface of the detector, resulting in different magnification of the image produced at the detector over the surface of the detector, and therefore over the field of view of the sensor sub-system. The degree or level of magnification may be controlled using variable zoom lenses 434 and 436. Although there are two variable zoom lenses 434, 436 in the example illustrated in FIG. 4, the optics 430 may include more or fewer than two lenses, and may also or alternatively include reflective optical elements (e.g., one or more mirrors) rather than, or in addition to, refractive elements.

Figure 5:
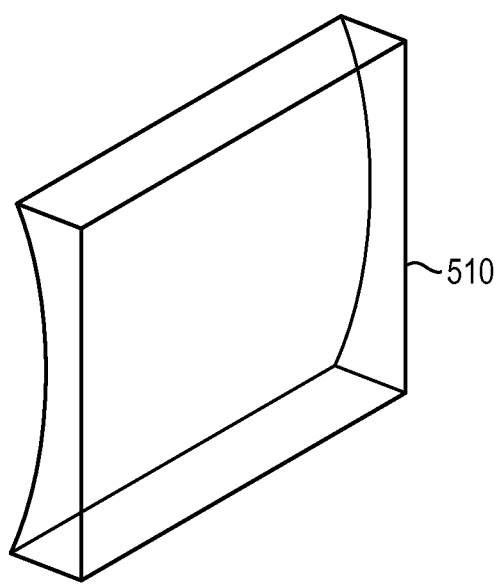
FIG. 5 is a diagram of one example of a concave lens which may be used as a curvature enhancer in optics configured to provide variable lateral magnification over the field of view of the optical system, according to aspects of the invention.
Figure 6:
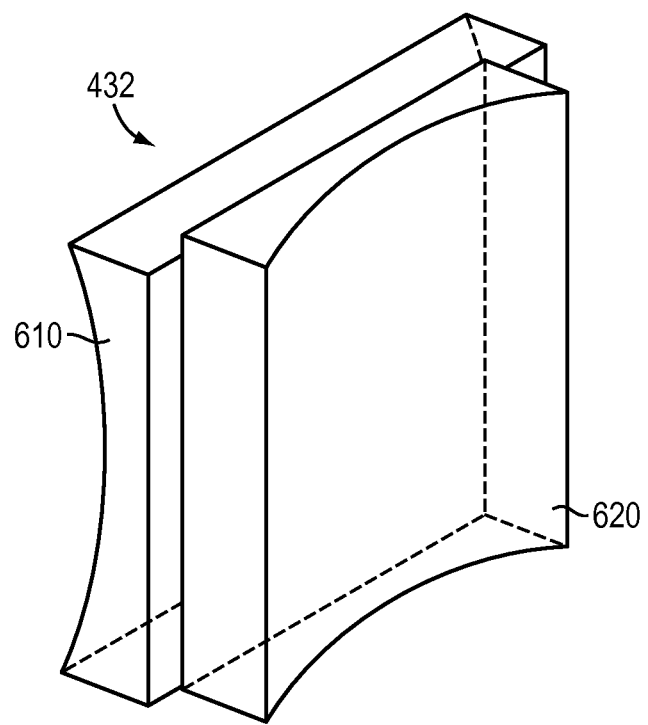
FIG. 6 is a diagram of another example of a curvature enhancer including a pair of cylindrical lenses, according to aspects of the invention.

According to one embodiment, a variable lateral magnification distribution of the type illustrated in FIG. 3B (i.e., higher magnification in the center of the field of view and lower magnification towards the periphery) may be achieved using a curvature enhancer 432 that includes a concave lens placed at the focal plane 420 of the primary optics 410. An example of a concave lens 510 which may be used for the curvature enhancer 432 is illustrated in FIG. 5. In this example, the magnification decreases radially from the center of the field of view to the periphery as the concave lens 510 of the curvature enhancer 432 images the curved focal plane 420 onto the substantially flat detector 140. In another embodiment, the curvature enhancer 432 may include a pair of cylindrical lenses 610, 620, as illustrated in FIG. 6. In this example, the curvature enhancer 432 similarly provides higher magnification towards the center of the field of view, and lower towards the periphery of the field of view. These arrangements may advantageously provide improved ability to aim at or track a target in or near the center of the field of view (since the high magnification in this region may provide high resolution imaging of the target), while maintaining a larger degree of situational awareness at the periphery.

Various aspects, embodiments, and examples of optics configured to provide variable lateral magnification over the field of view are described in more detail in commonly-owned, co-pending U.S. application Ser. No. 14/161,131 titled "EYEPIECE FOR VARIABLE LATERAL MAGNIFICATION IMAGING SYSTEM" and filed on Jan. 22, 2014, which is herein incorporated by reference in its entirety for all purposes.

Thus, according to certain aspects and embodiments, one or more sensor sub-systems may be provided with the capability to produce images with variable lateral magnification. As a result, certain portion of the image may be viewed with high resolution, while still maintaining the ability to also (and simultaneously) view a wider field of view with lower resolution. This ability provide an advantage in that a target object near the center of the field of view, for example, may be imaged with high magnification, while coverage of a large field of view is maintained at lower magnification, thereby providing better contextual information and situational awareness. Thus, by displaying images with variable lateral magnification on the display 170, it may be significantly easier to maintain the target within the field of view, making tracking of the target as it moves much easier.

A concept that is similar to variable lateral magnification in some respects, although vastly different in others, is foveated imaging, which is a digital image processing technique in which the image resolution, or amount of detail, varies across the image according to one or more "fixation points." A fixation point indicates the highest resolution region of the image and corresponds to the center of the eye's retina, the fovea. The location of a fixation point may be specified, either manually or by a computer algorithm, using a pointing device, such as a computer mouse, for example, or using an eye-tracking mechanism that monitors the position of the eye. A foveated image maintains a large field of view, and has high resolution at the fixation points in the image, but has a blurred periphery and no magnification (or uniform magnification over the whole image). By contrast, an image with variable lateral magnification according to embodiments discussed above has high magnification over a portion of the image (e.g., the central region) and lower magnification elsewhere, while also maintaining a large field of view. Furthermore, unlike a foveated image, providing a display with variable lateral magnification may significantly improve a human operator's ability to track and aim at a moving target, as discussed above.

Thus, aspects and embodiments may provide optical imaging systems capable of providing and displaying an image with variable lateral magnification over the field of view, which allows for a greatly improved ability to track a target. As discussed above, the magnification level as well as the distribution of the magnification over the field of view may be dynamically varied, further providing for enhanced tracking and/or targeting capabilities. Additionally, the display 170 may be dynamically configured to display various images and information obtained from the sensor sub-systems 110, 120, 130 in different spectral bands. The information gathered in each spectral band may provide different information about a tracked target, and/or may have different performance under different operating conditions. Thus, the ability to acquire and accurately track a target may be enhanced through the ability to simultaneously view multi-spectral images overlaid on the display 170, as discussed above.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A multi-spectral imaging system comprising:
   a first sensor sub-system configured to receive electromagnetic radiation in a first spectral band from a scene and to provide a first image signal, wherein the first spectral band includes the ULF/VLF spectral band;
   a second sensor sub-system configured to receive electromagnetic radiation in a second spectral band from the scene and to provide a second image signal, wherein the second spectral band includes the visible spectral band;
   a processor coupled to the first and second sensor sub-systems and configured to produce a ULF/VLF image of the scene from the first image signal, and a visible image of the scene from the second image signal, the visible image having a variable lateral magnification, wherein the variable lateral magnification includes a gradient magnification across the visible image; and a display coupled to the processor and configured to display the visible image overlaid with the ULF/VLF image.

2. The multi-spectral imaging system of claim 1, wherein the each of the first sensor sub-system and the second sensor sub-systems includes a photo-sensitive detector and optics configured to focus the electromagnetic radiation onto the detector.

3. The multi-spectral imaging system of claim 1, further comprising a third sensor sub-system configured to receive electromagnetic radiation in a third spectral band from a scene and to provide a third image signal,
   wherein the processor is coupled to third sensor sub-system and configured to produce a third image of the scene from the third image signal; and
   wherein the display is configured to display the third image overlaid with the ULF/VLF and visible images.

4. The multi-spectral imaging system of claim 3, wherein the third spectral band includes the RF spectral band.

5. The multi-spectral imaging system of claim 1, wherein the second sensor sub-system comprises:
   a first camera having a first field of view and a first level of magnification, and configured to produce a first component image; and
   a second camera aligned with the first camera and having a second field of view, different from the first field of view, and a second level of magnification, different from the first level of magnification, and configured to produce a second component image; and
   wherein the processor is coupled to the first and second cameras and configured to digitally process the first and second component images to produce the visible image as a composite image having the variable lateral magnification derived from the first and second component images.

6. The multi-spectral imaging system of claim 5, wherein the second field of view is narrower than the first field of view, and the second level of magnification is higher than the first level of magnification; and
   wherein the second field of view corresponds to a central portion of the first field of view.

7. The multi-spectral imaging system of claim 6, wherein the processor is configured to digitally process the first and second component images to produce the composite image having high magnification in a center of the composite image, and progressively lower magnification towards a periphery of the composite image.

8. The multi-spectral imaging system of claim 1, wherein the second sensor sub-system comprises:
   primary optics configured to receive and direct the electromagnetic radiation in the second spectral band onto a focal plane to form a substantially planar intermediate image at the focal plane, the intermediate image having substantially uniform lateral magnification;
   second optics configured to reimage the intermediate image onto an image plane to produce an output image having variable lateral magnification; and
   a photo-sensitive detector positioned at the image plane configured to produce the second image signal corresponding to the output image.

9. The multi-spectral imaging system of claim 8, wherein the second optics comprises:
   a curvature enhancer positioned on the focal plane and configured to curve the focal plane to form a curved focal plane; and
   at least one variable focus lens or mirror configured to reimage the intermediate image formed at the curved focal plane onto the image plane.

10. The multi-spectral imaging system of claim 9, wherein the curvature enhancer includes a cylindrical concave lens.

11. The multi-spectral imaging system of claim 9, wherein the curvature enhancer includes a pair of cylindrical lenses.

12. A multi-spectral imaging method comprising:
   receiving electromagnetic radiation in the ULF/VLF spectral band and producing a ULF/VLF image therefrom;
   receiving electromagnetic radiation in the visible spectral band and producing therefrom a visible image having a variable lateral magnification, wherein the variable lateral magnification includes a gradient magnification across the visible image; and
   displaying the visible image overlaid with the ULF/VLF image on a display.

13. The multi-spectral imaging method of claim 12, wherein producing the visible image includes:
   bending the electromagnetic radiation in the visible spectral band to form a curved focal plane;
   relaying the electromagnetic radiation in the second visible band from the curved focal plane onto a photo-sensitive detector positioned on an image plane, the photo-sensitive detector having a surface that is substantially flat in the image plane; and
   producing the visible image with the photo-sensitive detector.

14. The multi-spectral imaging method of claim 12 wherein producing the visible image includes:
   receiving a first component image having a first level of magnification and representing a first field of view;
   simultaneously receiving a second component image having a second level of magnification and representing a second field of view, the second level of magnification being higher than the first level of magnification and the second field of view being narrower than the first field of view; and
   digitally processing the first and second component images to produce the visible image having the variable lateral magnification derived from the first and second levels of magnification.

15. The multi-spectral imaging method of claim 14, wherein digitally processing the first and second component images to produce the visible image includes producing the visible image having the second level of magnification at a center of the visible image and the first level of magnification at a periphery of the visible image.

* * * * *